US009989099B2

(12) United States Patent
Davies et al.

(10) Patent No.: US 9,989,099 B2
(45) Date of Patent: Jun. 5, 2018

(54) SPLINED COUPLINGS

(71) Applicant: Goodrich Actuation Systems Limited, West Midlands (GB)

(72) Inventors: Stephen Davies, Shrewsbury (GB); Mark Hubberstey, Strafford (GB); David Holman, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days. days.

(21) Appl. No.: 15/466,075

(22) Filed: Mar. 22, 2017

(65) Prior Publication Data

US 2017/0276182 A1 Sep. 28, 2017

(30) Foreign Application Priority Data

Mar. 24, 2016 (GB) .................... 1605057.7

(51) Int. Cl.
*B64C 13/28* (2006.01)
*F16D 3/18* (2006.01)
*F16D 3/06* (2006.01)

(52) U.S. Cl.
CPC ............... *F16D 3/06* (2013.01); *B64C 13/28* (2013.01); *F16D 3/185* (2013.01); *F16D 2300/06* (2013.01); *Y10T 403/7032* (2015.01)

(58) Field of Classification Search
CPC ... B64C 9/14; B64C 13/28; F16D 1/06; F16D 3/06; F16D 3/185; F16D 2001/103;
(Continued)

(56) References Cited

U.S. PATENT DOCUMENTS 2,434,589 A * 1/1948 Roth .................... F16J 15/36
403/359.4
2,822,676 A 2/1958 Marcus
(Continued)

FOREIGN PATENT DOCUMENTS

DE 102013020158 * 6/2015 ............. B64C 13/28
DE 102013020158 A1 6/2015
(Continued)

OTHER PUBLICATIONS

Mortier, et al. Chemistry and Technology of Lubricants. Dec. 2009. Springer. Third Edition. p. 368. LCCN: 2009926950. ISBN: 9781402086618.*
(Continued)

*Primary Examiner* — Josh Skroupa
(74) *Attorney, Agent, or Firm* — Cantor Colburn LLP

(57) ABSTRACT

A splined coupling comprises a radially inner shaft and a radially outer shaft having a cavity for receiving the inner shaft. First splines are provided on a radially outwardly facing surface of the inner shaft. Second splines are provided on a radially inwardly facing surface of the cavity of the outer shaft. The first splines are slidably engaged with the second splines. At least one biasing element, for example a diaphragm is arranged to act between the radially inner and radially outer shafts for locating the first splines in a desired axial position relative to the second splines and to provide a biasing force resisting the axial movement of the first splines relative to the second splines upon relative axial movement of the inner and outer shafts.

13 Claims, 2 Drawing Sheets

(58) Field of Classification Search
CPC .......... F16D 2300/06; Y10T 403/7026; Y10T 403/7028; Y10T 403/7031; Y10T 403/7032; Y10T 403/7033; Y10T 403/7035
USPC .......... 403/359.1–359.6; 464/157–159, 162, 464/169, 16
See application file for complete search history.

(56) References Cited

U.S. PATENT DOCUMENTS

| | | | | |
|---|---|---|---|---|
| 2,914,929 | A * | 12/1959 | Irons ...................... | F16D 41/22 464/169 |
| 3,673,814 | A * | 7/1972 | Carman ................. | F16D 3/185 464/150 |
| 4,042,088 | A * | 8/1977 | Schmohe ............... | F16D 11/04 192/114 R |
| 4,112,710 | A * | 9/1978 | Okuda .................... | F16D 3/06 464/169 |
| 4,136,532 | A * | 1/1979 | Okuda .................... | F16D 3/06 464/113 |
| 4,772,245 | A | 9/1988 | Readman et al. | |
| 4,913,681 | A * | 4/1990 | Green .................... | F16D 3/185 464/169 |
| 5,474,499 | A | 12/1995 | Olson | |
| 6,217,453 | B1 | 4/2001 | Thompson | |
| 6,283,869 | B1 * | 9/2001 | Spensberger .......... | F16D 3/185 464/169 |
| 7,048,234 | B2 | 5/2006 | Recksiek et al. | |
| 7,114,601 | B2 | 10/2006 | Mayer et al. | |
| 9,261,150 | B2 | 2/2016 | Heintjes | |
| 2008/0257676 | A1 | 10/2008 | Shaffer | |
| 2016/0223038 | A1 * | 8/2016 | Murphy ................ | F16D 65/028 |

FOREIGN PATENT DOCUMENTS

| | | | |
|---|---|---|---|
| EP | 0026681 A1 | 4/1981 | |
| EP | 2803584 A1 * | 11/2014 | .............. B64C 9/16 |
| GB | 2043207 A | 10/1980 | |
| GB | 1579503 A | 11/1980 | |
| GB | 2180625 A * | 4/1987 | ............ F16D 3/185 |
| JP | S62117328 | 7/1987 | |

OTHER PUBLICATIONS

European Search Report for Application No. 17162336.6-1762 dated Aug. 14, 2017, 9 pages.
IPO Search Report for International Application No. 1605057.7, dated Sep. 22, 2016, 3 pages.
Ortier, et al., "Chemistry and Technology of Lubricants", Dec. 2009, Springer. Third Edition, p. 368. LCCN: 2009926950. ISBN: 9781402086618.

* cited by examiner

SPLINED COUPLINGS

FOREIGN PRIORITY

This application claims priority to Great Britain Patent Application No. 1605057.7 filed Mar. 24, 2016, the entire contents of which is incorporated herein by reference.

TECHNICAL FIELD

The present disclosure relates to splined couplings.

BACKGROUND

Splined couplings are used in a wide variety of applications to transmit torque and rotary motion between input and output drive members. A common form of splined coupling comprises external splines formed on a radially outer surface of a first shaft and internal splines formed on a radially inner surface of a second shaft. The splines interengage so as to transmit torque but also allow for some relative axial movement between the shafts and for some limited angular deflection between the shafts.

One application for such a splined coupling is in an actuator drive system in an aircraft wing. An aircraft wing typically has multiple actuators used to deploy control surfaces, for example flaps or slats. Power is transmitted to the actuators from a central power drive unit via a transmission line which inter alia includes a number of splined couplings arranged between adjacent drive shafts. The splined coupling allows for some relative axial movement between the shafts, which accommodates changes in the length of the transmission line as might arise upon flexing of the aircraft wing. A problem which may arise in practice is that during assembly of the coupling, it is not always possible to accurately locate the coupling components. Thus if, for example, the splines are fully engaged upon assembly, they may not be able to slide relative to one another and thus accommodate the relevant movement.

SUMMARY

In accordance with this disclosure there is provided a splined coupling. The coupling comprises a radially inner shaft and a radially outer shaft having a cavity for receiving said inner shaft. First splines are provided on a radially outwardly facing surface of the inner shaft. Second splines are provided on a radially inwardly facing surface of the cavity of the outer shaft. The first splines are slidably engaged with the second splines. At least one biasing element is arranged to act between the radially inner and radially outer shafts for locating the first splines in a desired axial position relative to the second splines and to provide a biasing force resisting the axial movement of the first splines relative to the second splines upon relative axial movement of the inner and outer shafts.

The at least one biasing element may comprise a diaphragm extending at least partially across the cavity of the outer shaft.

The diaphragm may be mounted to an end of the inner shaft.

An outer periphery of the diaphragm may be received in a groove formed on the radially inwardly facing surface of the cavity of the radially outer shaft.

The radially outer shaft may comprise a main body and a cap fastened to the main body and which closes said internal cavity. The groove may be formed between the main body part and the cap.

The outer periphery of the diaphragm may be received in the groove with limited axial and/or radial play.

The first splines may be provided on a radially outwardly facing surface of a radially projecting flange of the inner shaft.

The outer shaft may be cup shaped and the second splines may be provided on a radially inwardly facing surface of the cup shape.

The internal cavity may be at least partially filled with a grease lubricant, for example a clay based grease.

The first splines may be axially shorter than the second splines.

The first splines may be crowned and/or barreled.

The coupling may also comprise stops for limiting the axial movement of the inner and outer shafts relative to one another.

The disclosure extends to an actuator drive system comprising a splined coupling as discussed above.

The invention also extends to an aircraft comprising a plurality of actuators arranged at spaced apart locations along a wing of the aircraft for actuating control surfaces of the aircraft, and an actuator drive system as above for driving one or more of the actuators.

BRIEF DESCRIPTION OF DRAWINGS

An embodiment of this disclosure will now be described by way of example only with reference to the accompanying drawings in which.

DETAILED DESCRIPTION

Figure 1:
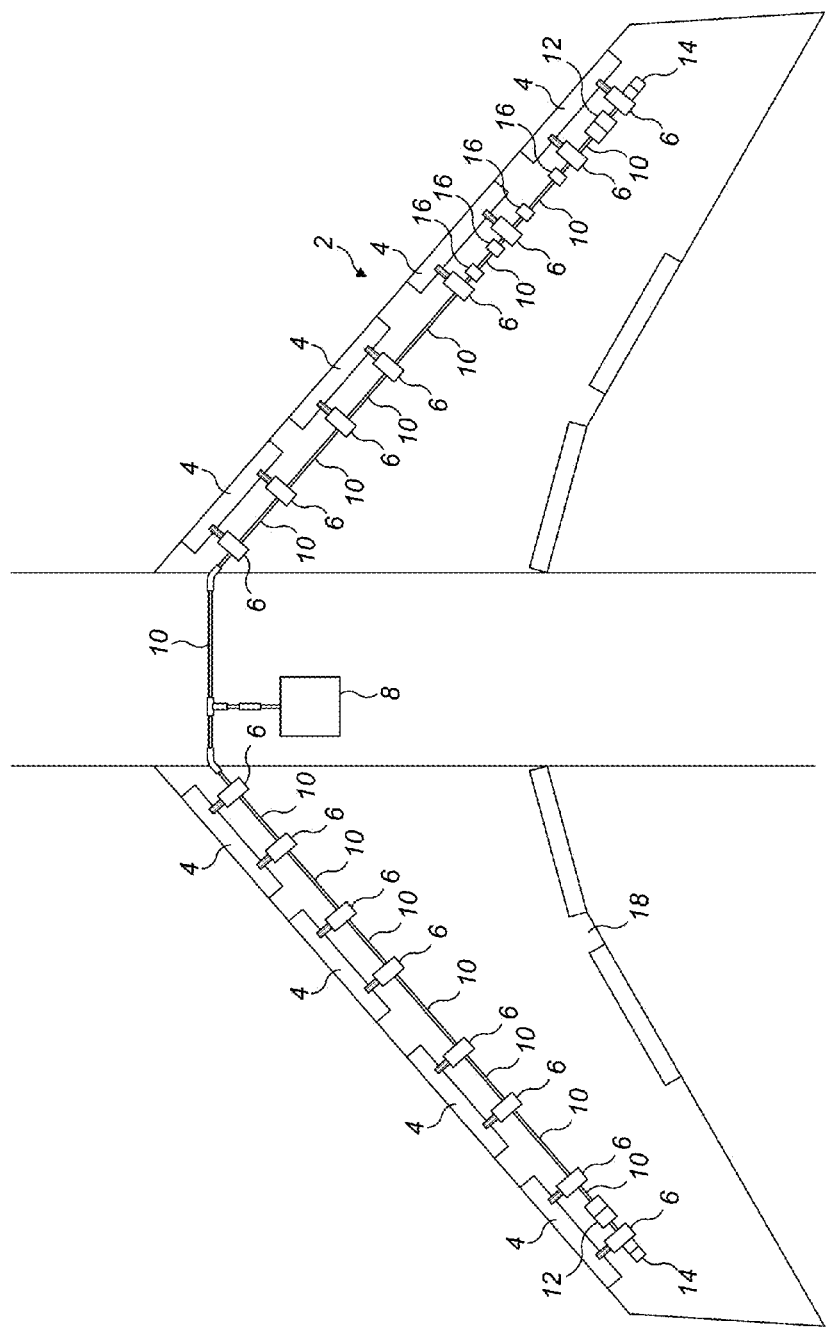
FIG. 1 shows an aircraft wing comprising a plurality of actuators.

FIG. 1 illustrates an aircraft slat actuator drive system 2. The system 2 comprises a plurality of leading edge slats 4 which are selectively deployed and retracted by rotary actuators 6. Each actuator 6 is powered by a rotary drive from a common power drive unit 8. Drive is transmitted from the power drive unit 8 via a transmission line comprising a series of power transmission shafts 10 which connect the actuators 6 in series. Brakes 12 and asymmetry sensors 14 may also be included in a typical system. The power transmission shafts 10 are coupled to the actuators 6 via splined couplings 16, only a number of which are shown schematically in the Figure. In use the aircraft wings 18 will deflect which will in effect change the length of the transmission line. The splined couplings 16 accommodate such changes in length.

Figure 2:
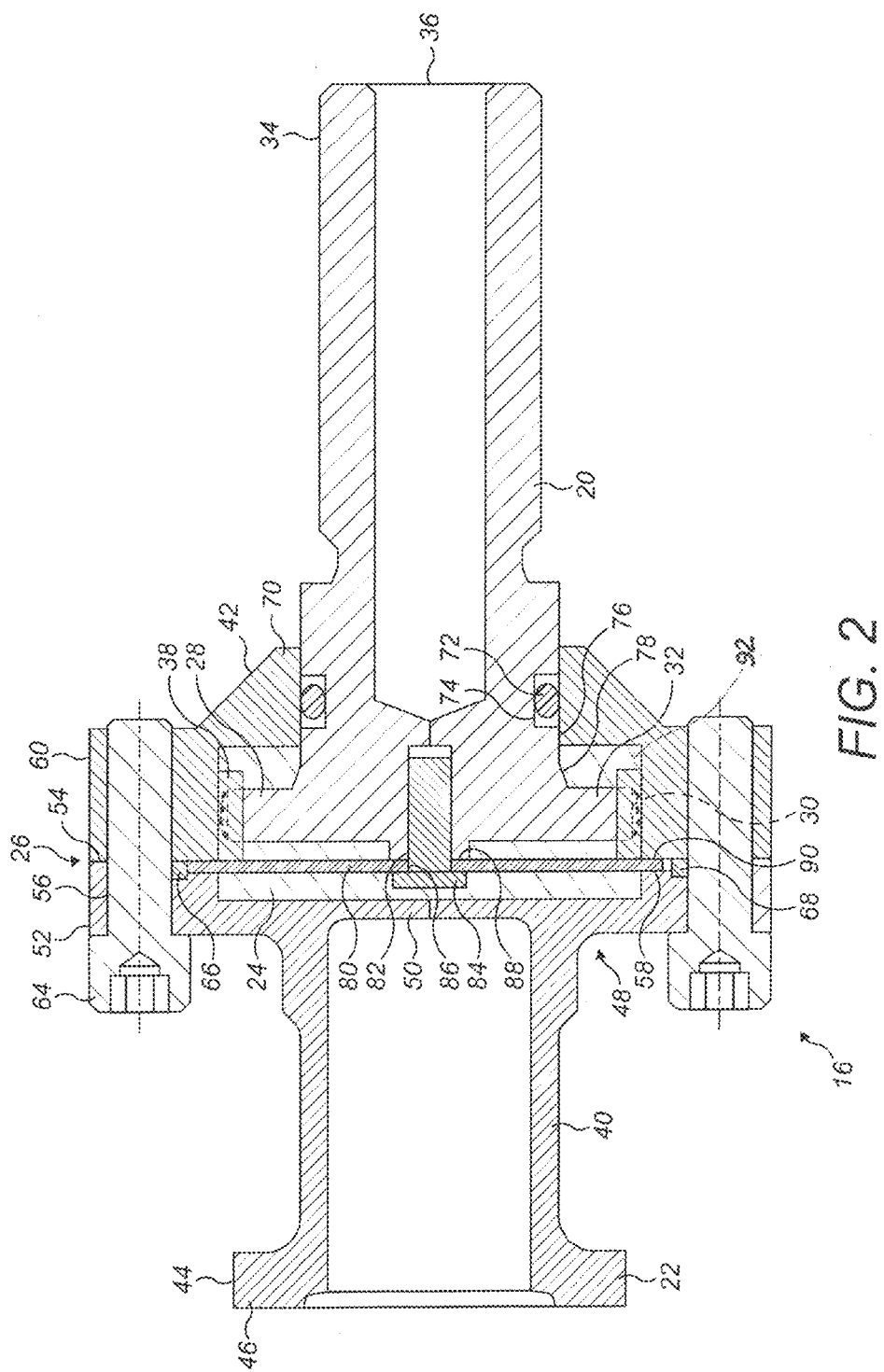
FIG. 2 shows a cross section through a splined coupling in accordance with this disclosure.

With reference to FIG. 2, an exemplary embodiment of splined coupling 16 in accordance with the disclosure comprises a radially inner shaft 20 and a radially outer shaft 22. The radially outer shaft 22 has a cavity 24 formed at a first end 26 thereof for receiving a first end 28 of the radially inner shaft 20.

The radially inner shaft 20 comprises a plurality of axially extending first splines 30. The first splines 30 are provided on a radially outwardly facing surface of a radially projecting annular flange 32 formed at the first end of 28 the inner shaft 20. Splines 34 are provided at an opposite, second end 36 of the inner shaft 20 for coupling to, for example, a transmission shaft 10 as discussed above. Other forms of coupling can also be employed as appropriate.

The radially outer shaft 22 comprises a plurality of axially extending second splines 38. The second splines 38 are provided on a radially inwardly facing surface of the first end 26 of the outer shaft 22.

The first splines 30 are slidably engaged with the second splines 38. In this embodiment, the first splines 30 are shorter in axial length than the second splines 38, although this is not essential. The first splines 30 may also be crowned and/or barreled in order to allow for angular misalignment between the inner and outer shafts 20, 22.

The radially outer shaft 22 comprises a main body 40 and a cap 42.

A first end 44 of the main body 40 is provided with a flange 46 through which the outer shaft 22 may be coupled to a further component via fasteners (not shown). For example three or four fasteners may be spaced around the flange 46. Of course other forms of coupling may be provided.

A second end 48 of the main body 40 is generally cup-shaped and comprises an internal wall 50 which forms one end of the cavity 24. A flange 52 extends radially outwardly from the wall 48. The flange 52 has an axially facing mating face 54 and a plurality (for example four) of openings 56 therethrough. The mating face 54 further comprises an axially facing recess 58.

The cap 42 comprises a radially outer flange 60 provided with a plurality of openings 62 aligned in use with the openings 56 of the main body 40 to receive a plurality of fasteners, for example threaded fasteners 64, for joining the cap 42 to the main body portion 40. The outer flange 60 has a planar mating face 66 for mating with the mating face 54 of the main body 40. It will be seen that when the mating faces 54, 66 are mated, the recess 58 of the main body 40 and the planar surface 54 of the cap 42 form a groove 68 on the radially inwardly facing surface of the cavity 24. Of course, the groove 68 may be formed in other ways. For example, the recess 58 may be formed on the cap 42 instead of on the main body 40, or recesses formed on both the cap 42 and the main body 40.

The second splines 38 of the outer shaft 22 are formed on a radially inwardly facing surface of flange 60. However, in other embodiments, they may be formed on a corresponding surface of the main body 40.

The cap 42 further includes an inwardly extending collar 70 which forms a sliding seal with the first end 28 of the inner shaft 20. An O-ring or other annular seal 72 may be received in a groove 74 on the inner shaft 20 for receiving the seal 72. The cap 42 effectively closes the cavity 24.

The cavity 24 may be filled or partially filled with a lubricating material such as grease 92 to facilitate sliding engagement of the splines 30, 38. A number of greases are known for this purpose, but a clay-based grease such as Mobilgrease 28 may be particularly suitable for the purpose. The seal 72 helps prevent escape of the lubricating material out of the cavity 24 and will also prevent ingress of contaminants into the cavity 24.

The collar 70 also has a stop surface or edge 76 which may engage with a stop surface or edge 78 provided on the inner shaft 20 so as to form a stop for limiting axial movement of the inner shaft 20 in one direction. Other stop arrangements can also easily be envisaged.

A resilient biasing element in the form of a diaphragm 80 is mounted to the end surface 82 of the inner shaft 20 by means of a fastener 84, for example a threaded fastener. The head 86 of the fastener 84 faces the internal wall 50 of the outer shaft main body 40 and together the fastener head 86 and the internal wall 50 form a stop for limiting axial movement of the inner shaft 20 in the other direction. The diaphragm 80 engages a raised area or boss 88 formed on the end surface 82 to provide appropriate clearance during deflection of the diaphragm 80.

The outer periphery 90 of the diaphragm 74 is received in the groove 68 formed in the inner surface of the outer shaft 22. The diaphragm 74 is not tightly received in the groove, and clearance is provided in both a radial and an axial direction to allow for radial expansion and contraction of the diaphragm 74 in use, and also for axial deformation of the diaphragm 74 in use.

The diaphragm 80 may be of any suitable resilient material. For example, the diaphragm 80 may be made from a stainless steel, Titanium or Copper Beryllium, depending on the particular application.

Having described its general construction, the operation of the splined coupling 2 will now be described.

In use, the splined coupling 2 will be installed for example in an actuator drive system as shown in FIG. 1. During installation into the drive system, the coupling 2 may be subjected to axial forces which may cause the first and second splines 30, 38 to slide relative to one another. The purpose of the splined coupling 2 is of course to permit relative such sliding, but if the splines 30, 38 are improperly axially aligned during assembly into the drive system, then the full range of axial movement may not be available, for example if the inner shaft 20 is inserted too far into the cavity 24. The diaphragm 80 mitigates this problem, since it acts to position the inner shaft 20 relative to the outer shaft 22 in the desired axial position.

In FIG. 2, the diaphragm is shown in a neutral, undeflected position, corresponding to the desired relative axial positions of the first and second splines 30, 38. In this position, the first splines 30 are axially centred within the second splines 38. If, during installation of the coupling 2 into the drive system, the assembler tries to push the inner shaft 20 too far into the outer shaft 22 or pull it too far out of the outer shaft 22, then the diaphragm 80 will deflect resiliently to resist such movements. Thus, the splines 30, 38 of the inner and outer shafts 20, 22 will be properly aligned to allow the fullest range of relative axial movement.

The maximum axial movement of the splines may vary from application to application. Typically, however, the movement may be ±2.5 mm from the neutral position. The alignment force exerted by the diaphragm 80 during the installation process may typically be less than 500 lbf (2.23 kN). The maximum force exerted by the diaphragm 80, for example in either of its maximum deflected positions, may be less than 1000 lbf (4.45 kN). The maximum deflection of the diaphragm 80 and movement of the splines 30, 38 in either axial direction is limited by the engagement of the fastener head 86 with the wall 50 in one direction and the stop surfaces 76, 78 in the other direction.

The particular configuration shown may also be less prone to jamming. By providing the splines 30, 38 on the radially outer flanges 32, 60, the torque exerted through the splines 30, 38 is reduced compared if the splines 30, 38 were simply formed on the inner and outer surfaces of the main shaft parts. Thus, less force may be required to pull the shafts 20, 22 apart, meaning that relative axial movement of the shafts 20, 22 may be possible over a wider operating range, for example at very low temperatures.

Also, the use of a clay based grease in the cavity 24 may also be advantageous in this context.

It will be appreciated that the above is a description of just an exemplary embodiment of the disclosure and that various changes and modifications may be made thereto within the scope of the disclosure. For example, while a diaphragm 80 is disclosed for axially locating the shafts relative to one another, other resilient elements may be used suitably positioned may be used. Also, other means may be provided for locating the diaphragm 80.

The invention claimed is:

1. A splined coupling comprising:
   a radially inner shaft;
   a radially outer shaft having a cavity for receiving said inner shaft;
   first splines provided on a radially outwardly facing surface of said inner shaft;
   second splines provided on a radially inwardly facing surface of said cavity of said outer shaft, said first spline slidably engaged with said second splines; and
   at least one biasing element acting between said radially inner and radially outer shafts for locating said first splines in a desired axial position relative to said second splines and providing a biasing force resisting the axial movement of said first splines relative to the second splines upon relative axial movement of said inner and outer shafts;
   wherein said at least one biasing element is a diaphragm extending at least partially across said cavity of said outer shaft; and
   wherein an outer periphery of said diaphragm is received in a groove formed on the radially inwardly facing surface of the cavity of the radially outer shaft.

2. A splined coupling as claimed in claim 1, wherein said diaphragm is mounted to an end of said inner shaft.

3. A splined coupling as claimed in claim 1, wherein said radially outer shaft comprises a main body part and a cap fastened to the main body part and which closes said cavity, said groove being formed between said main body part and said cap.

4. A splined coupling as claimed in claim 1, wherein said outer periphery of said diaphragm is received in the groove with limited axial and optionally radial play.

5. A splined coupling as claimed in claim 1, wherein said first splines are provided on a radially outwardly facing surface of a radially projecting flange of said inner shaft.

6. A splined coupling as claimed in claim 5, wherein an end of said outer shaft is cup shaped and said second splines are provided on a radially inwardly facing surface of said cup shape.

7. A splined coupling as claimed in claim 1, wherein said cavity is partially filled with a grease lubricant.

8. A splined coupling as claimed in claim 7, wherein said grease is a clay based grease.

9. A splined coupling as claimed in claim 1, wherein the first splines are axially shorter than the second splines.

10. A splined coupling as claimed in claim 1, wherein said first splines are crowned or barrelled.

11. A splined coupling as claimed in claim 1, comprising stops for limiting the axial movement of the inner and outer shafts relative to one another.

12. An actuator drive system comprising a splined coupling as claimed in claim 1.

13. An aircraft comprising a plurality of actuators arranged at spaced apart locations along a wing of the aircraft for actuating control surfaces of the aircraft, and an actuator drive system for driving one or more of said actuators, the actuator drive system including a splined coupling that includes:
    a radially inner shaft;
    a radially outer shaft having a cavity for receiving said inner shaft;
    first splines provided on a radially outwardly facing surface of said inner shaft;
    second splines provided on a radially inwardly facing surface of said cavity of said outer shaft, said first splines slidably engaged with said second splines; and
    at least one biasing element acting between said radially inner and radially outer shafts for locating said first splines in a desired axial position relative to said second splines and providing a biasing force resisting the axial movement of said first splines relative to the second splines upon relative axial movement of said inner and outer shafts;
    wherein said at least one biasing element is a diaphragm extending at least partially across said cavity of said outer shaft; and
    wherein an outer periphery of said diaphragm is received in a groove formed on the radially inwardly facing surface of the cavity of the radially outer shaft.

\* \* \* \* \*